United States Patent
Wu et al.

(10) Patent No.: US 10,651,721 B2
(45) Date of Patent: May 12, 2020

(54) MULTI-PHASE CONVERTER AND ASSOCIATED CONTROL CIRCUIT AND CONTROL METHOD FOR UNDERSHOOT IMPROVEMENT

(71) Applicant: Chengdu Monolithic Power Systems Co. Ltd., Chengdu (CN)

(72) Inventors: Xiaokang Wu, Hangzhou (CN); Lijie Jiang, Hangzhou (CN); Suhua Luo, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/453,936

(22) Filed: Jun. 26, 2019

(65) Prior Publication Data

US 2020/0007023 A1   Jan. 2, 2020

(30) Foreign Application Priority Data

Jun. 27, 2018 (CN) .......................... 2018 1 0679831

(51) Int. Cl.
*H02M 1/084* (2006.01)
*H02M 3/157* (2006.01)
*H02M 3/158* (2006.01)
*H02M 1/00* (2006.01)

(52) U.S. Cl.
CPC ......... *H02M 1/0845* (2013.01); *H02M 3/157* (2013.01); *H02M 3/1584* (2013.01); *H02M 2001/0006* (2013.01); *H02M 2001/0029* (2013.01)

(58) Field of Classification Search
CPC ...... H02M 1/0845; H02M 3/15; H02M 3/156; H02M 3/157; H02M 3/158; H02M 3/1584; H02M 2001/0006; H02M 2001/0029
See application file for complete search history.

(56) References Cited

U.S. PATENT DOCUMENTS

| | | | |
|---|---|---|---|
| 9,479,043 B2 | 10/2016 | Lijie | |
| 10,498,241 B2* | 12/2019 | Wu | H02M 3/1584 |
| 2010/0315052 A1* | 12/2010 | Zambetti | H02M 3/1584 323/282 |
| 2013/0057242 A1* | 3/2013 | Zambetti | H02M 3/1584 323/282 |
| 2014/0022684 A1* | 1/2014 | Jiang | H02H 3/08 361/93.1 |
| 2015/0236580 A1* | 8/2015 | Jiang | H02M 3/1584 327/150 |
| 2015/0270773 A1* | 9/2015 | Jiang | H02M 1/32 323/234 |

(Continued)

OTHER PUBLICATIONS

U.S. Appl. No. 16/228,131, filed Dec. 20, 2018, Xiaokang.

*Primary Examiner* — Adolf D Berhane
(74) *Attorney, Agent, or Firm* — Perkins Coie LLP

(57) ABSTRACT

A multi-phase converter has a plurality of switching circuits coupled in parallel and a control circuit. The control circuit provides a set signal to successively turn ON the switching circuits under power operation based on an output voltage, a reference signal and a nonlinear control signal. When a number of switching circuits under power operation decreases, the nonlinear control signal increases to a preset value from an initial value, and then the nonlinear control signal decreases to the initial value with a preset slew rate.

20 Claims, 7 Drawing Sheets

(56) References Cited

U.S. PATENT DOCUMENTS

| | | | |
|---|---|---|---|
| 2016/0172959 A1* | 6/2016 | Hu | H02M 3/156 307/31 |
| 2017/0248996 A1* | 8/2017 | Zhang | G06F 1/26 |
| 2018/0175734 A1* | 6/2018 | Gherghescu | H02M 3/1584 |
| 2018/0191333 A1* | 7/2018 | Chen | H02M 3/156 |

* cited by examiner

MULTI-PHASE CONVERTER AND ASSOCIATED CONTROL CIRCUIT AND CONTROL METHOD FOR UNDERSHOOT IMPROVEMENT

CROSS-REFERENCE TO RELATED APPLICATION

This application claims the benefit of CN application No. 201810679831.4, filed on Jun. 27, 2018, and incorporated herein by reference.

TECHNICAL FIELD

The present invention relates to electrical circuit, more particularly but not exclusively relates to multi-phase converter.

BACKGROUND

A multi-phase converter comprises a plurality of switching circuits coupled in parallel with each other to satisfy a demand of high load current. In order to optimize the efficiency of the multi-phase converter, auto phase shedding is usually required. In phase shedding mode, a number of switching circuits under power operation is determined by a magnitude of the load current. When the load current is small, only part of the switching circuits are under power operation and transfer power to a load. Once the load reduces, the number of the switching circuits under power operation will reduce. However, due to delay of control, a large undershoot will happen on an output voltage of the multi-phase converter.

SUMMARY

It is one of the objects of the present invention to provide multi-phase converter and associated control circuit and control method.

One embodiment of the present invention discloses a multi-phase converter, configured to receive an input voltage, and configured to provide an output voltage and a load current to a load, the multi-phase converter comprising: a plurality of switching circuits coupled in parallel between the input voltage and the load, wherein a number of the plurality of switching circuits under power operation is determined based on the load current; and a control circuit, configured to provide a set signal to successively turn ON the specific plurality of switching circuits under power operation based on the output voltage, a reference signal and a nonlinear control signal; wherein when the number of the plurality of switching circuits under power operation decreases, the nonlinear control signal increases to a preset value from an initial value, and then the nonlinear control signal decreases to the initial value with a preset slew rate.

Another embodiment of the present invention discloses a control method for a multi-phase converter, wherein the multi-phase converter is configured to receive an input voltage, and configured to provide an output voltage and a load current to a load, and wherein the multi-phase converter comprises a plurality of switching circuits coupled in parallel between the input voltage and the load, the control method comprising: determining what specific number of the plurality of switching circuits under power operation based on the load current; providing a nonlinear control signal based on the number of the plurality of switching circuits under power operation, the nonlinear control signal having an initial value; and providing a set signal to successively turn ON the plurality of switching circuits under power operation based on the output voltage, a reference signal and the nonlinear control signal; wherein when the number of the plurality of switching circuits under power operation decreases, the nonlinear control signal equals a preset value, and then the nonlinear control signal decreases to the initial value with a preset slew rate.

Yet another embodiment of the present invention discloses a control circuit for a multi-phase converter, wherein the multi-phase converter is configured to receive an input voltage, and configured to provide an output voltage and a load current to a load, and wherein the multi-phase converter comprises a plurality of switching circuits coupled in parallel between the input voltage and the load, the control circuit comprising: a load current comparison unit, configured to receive a current sense signal indicative of the load current, and configured to provide a plurality of current comparison signals to control a number of the plurality of switching circuits under power operation via respectively comparing the current sense signal with a plurality of thresholds; a nonlinear control signal generation unit, configured to provide a nonlinear control signal, wherein when the number of the plurality of switching circuits under power operation decreases, the nonlinear control signal increases to a preset value from an initial value, and then the nonlinear control signal decreases to the initial value with a preset slew rate; a general comparison unit, configured to receive a feedback signal indicative of the output voltage, the general comparison unit is configured to provide a set signal to successively turn ON the specific plurality of switching circuits under power operation via comparing the feedback signal with a sum of a reference signal and the nonlinear control signal; and a logic control unit, coupled to the load current comparison unit to receive the plurality of current comparison signals, and coupled to the general comparison unit to receive the set signal, the logic control unit is configured to provide multiple control signals to respectively control the plurality of switching circuits based on the plurality of current comparison signals and the set signal.

Embodiments of the present invention, providing a nonlinear control signal which varies with decreasing of the number of switching circuits under power operation, could conspicuous reduce an undershoot of the output voltage once the number of switching circuits under power operation decreases.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Figure 1:
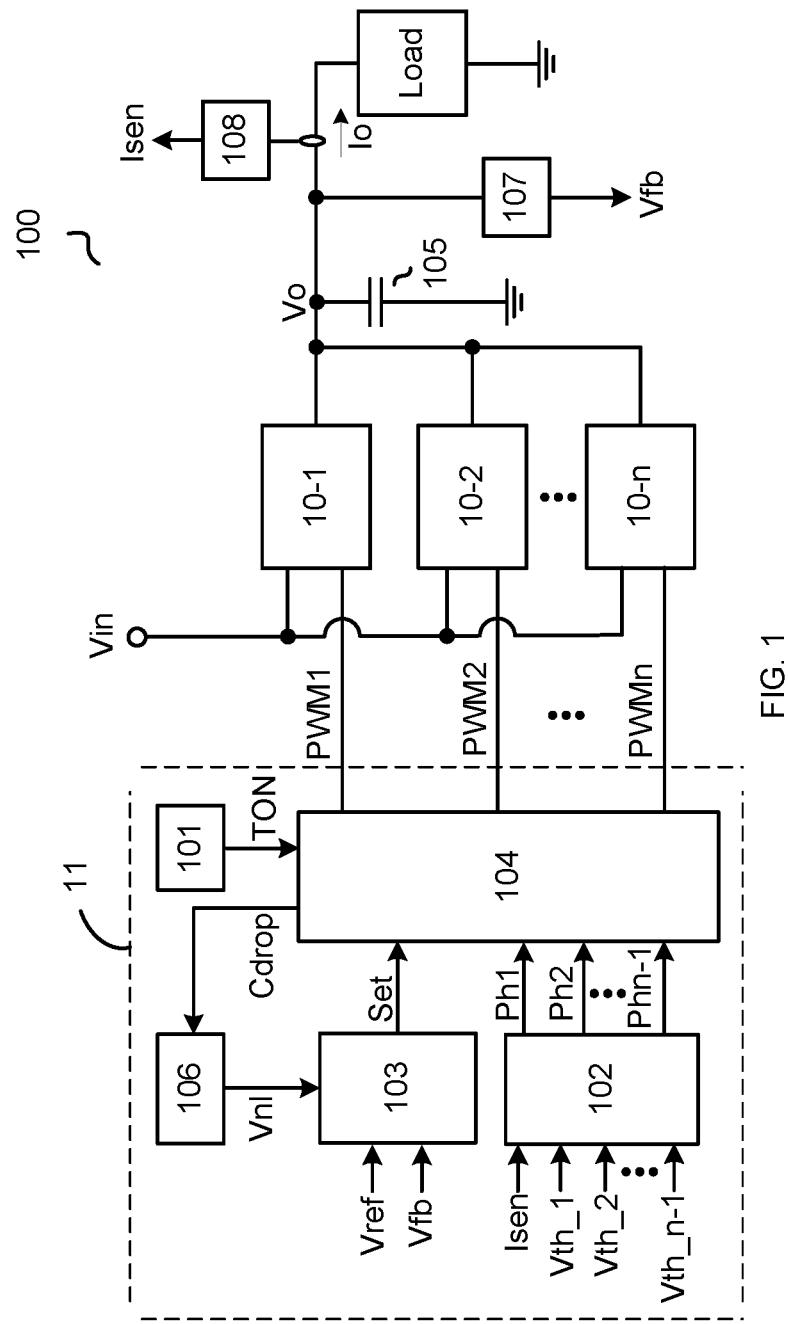
FIG. 1 illustrates a multi-phase converter 100 according to an embodiment of the present invention.

FIG. 1 illustrates a multi-phase converter 100 according to an embodiment of the present invention. Multi-phase converter 100 receives an input voltage Vin, and provides an output voltage Vo and a load current Io to a load. Multi-phase converter 100 comprises a plurality of switching circuits (10-1, 10-2, ..., 10-n) coupled in parallel between input voltage Vin and the load, a control circuit 11, a voltage feedback unit 107, a current feedback unit 108, and an output capacitor 105 coupled between an output terminal of multi-phase converter 100 and a reference ground. Voltage feedback unit 107 is coupled to the load, and provides a feedback signal Vfb indicative of output voltage Vo. Current feedback unit 108 provides current sense signal Isen indicative of load current Io flowing through the load. Control circuit 11 comprises: an ON-time generation unit 101, a load current comparison unit 102, a general comparison unit 103, a logic control unit 104, and a nonlinear control signal generation unit 106. Multi-phase converter 100 controls a number of switching circuits under power operation, that is controlling phase of switching circuits for providing power. Control circuit 11 provides a set signal Set to successively turn ON the switching circuits under power operation based on output voltage Vo, a reference signal Vref, and a nonlinear control signal Vnl. In one embodiment, when the number of switching circuits under power operation decreases, nonlinear control signal Vnl increases to a preset value from an initial value, and then, nonlinear control signal Vnl decreases to the initial value with a preset slew rate; and when the number of switching circuits under power operation increases or is unchanged, nonlinear control signal Vnl is maintained at the initial value. In one embodiment, the initial value is zero. In one embodiment, the preset value and/or the preset slew rate can be adjusted in advance.

ON-time generation unit 101 provides an ON-time threshold TON to control ON-time periods of the corresponding transistors inside the switching circuits under power operation. ON-time threshold TON could be set as a constant, or a value variable with the input voltage Vin or output voltage Vout.

Load current comparison unit 102 is coupled to current feedback unit 108 to receive current sense signal Isen. Load current comparison unit 102 is configured to determine the number of switching circuits under power operation based on current sense signal Isen. In one embodiment, load current comparison unit 102 compares current sense signal Isen respectively with a plurality of threshold (e.g., Vth_1, Vth_2, ..., Vth_n−1) to generate a plurality of current comparison signals (e.g., Ph1, Ph2, ..., Phn−1) to determine the number of switching circuits under power operation.

General comparison unit 103 is configured to receive feedback signal Vfb indicative of output voltage Vout, reference signal Vref, and nonlinear control signal Vnl, and configured to provide set signal Set via comparing feedback signal Vfb with sum of reference signal Vref and nonlinear control signal Vnl (i.e., Vref+Vnl). When sum of reference signal Vref and nonlinear control signal Vnl is larger than feedback signal Vfb (i.e., Vref+Vnl>Vfb), set signal Set turns ON one of the switching circuits under power operation.

Logic control unit 104 is coupled to ON-time generation unit 101, load current comparison unit 102, and general comparison unit 103, and logic control unit 104 is configured to provide control signals (e.g., PWM1, PWM2, ..., PWMn) based on set signal Set, ON-time threshold TON, and current comparison signals Ph1-Phn−1 to respectively control switching circuits (e.g., 10-1, 10-2, ..., 10-n).

Figure 2:
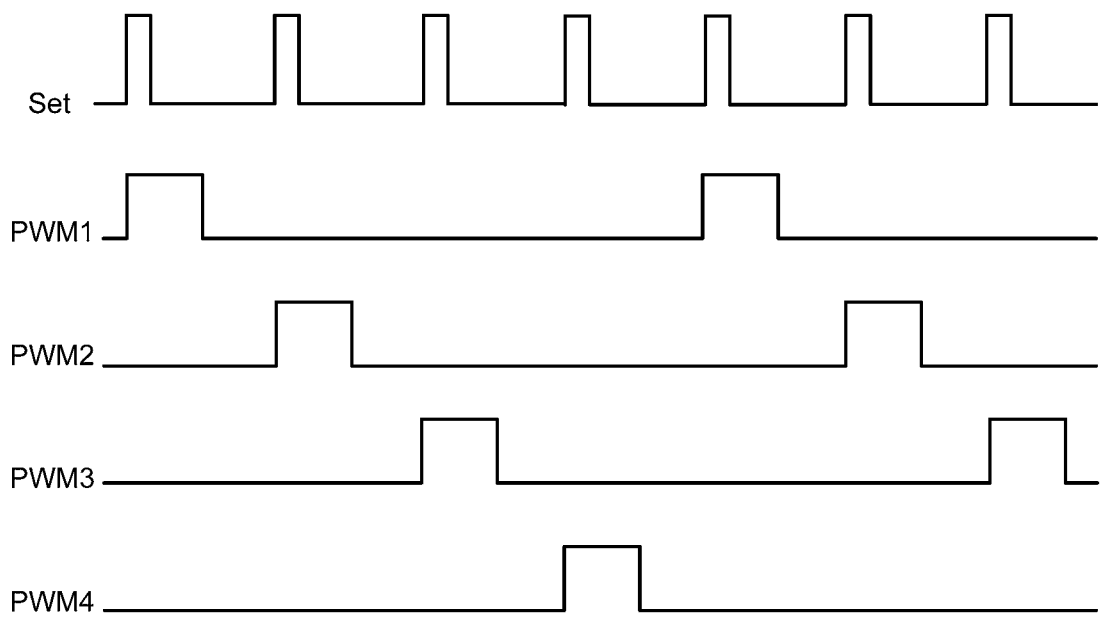
FIG. 2 shows waveforms of multi-phase converter 100 while four switching circuits are under power operation according to an embodiment of the present invention.
Figure 3:
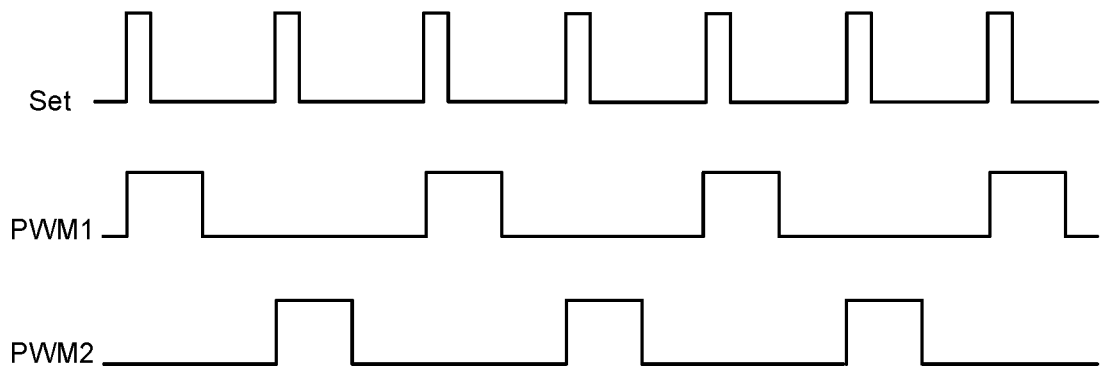
FIG. 3 shows waveforms of multi-phase converter 100 while two switching circuits are under power operation according to an embodiment of the present invention.

In one embodiment, logic control unit 104 determines the number of switching circuits under power operation based on current comparison signals Ph1-Phn−1, and all of the switching circuits or only part of the switching circuits enter power operation due to load current Io. In one embodiment, switching circuits under power operation will be interleaved turned ON by controlling of control signals PVVM1-PWMn. FIG. 2 shows waveforms of multi-phase converter 100 while four switching circuits are under power operation according to an embodiment of the present invention. And FIG. 3 shows waveforms of multi-phase converter 100 while two switching circuits are under power operation according to an embodiment of the present invention. Those switching circuits not under power operation remain OFF or in a high resistance state. As shown in FIG. 2 and FIG. 3, positive pulses of set signal SET are successively provided to one of the switching circuits under power operation to turn ON corresponding transistor of the one of the switching circuits under power operation, and the corresponding transistor is turned OFF when ON-time period of the corresponding transistor equals ON-time threshold.

Logic control unit 104 is further configured to provide power indicating signal Cdrop to indicate phase shedding of multi-phase converter 100, that is decreasing of the number of switching circuits under power operation based on current comparison signals Ph1-Phn−1.

Nonlinear control signal generation unit 106 is coupled to logic control unit 104 to receive power indicating signal Cdrop, and nonlinear control signal generation unit 106 is configured to provide nonlinear control signal Vnl. When power indicating signal Cdrop indicates that the number of switching circuits under power operation decreases, i.e., once phase shedding happens, nonlinear control signal Vnl increases to the preset value from the initial value, and then decreases to the initial value with the preset slew rate; and when power indicating signal Cdrop indicates that the number of switching circuits under power operation increases or is unchanged, nonlinear control signal Vnl is maintained at the initial value. Undershoot of output voltage Vo will be significantly reduced at the time that the number of switching circuits under power operation decreases when introducing nonlinear control signal Vnl.

Figure 4:
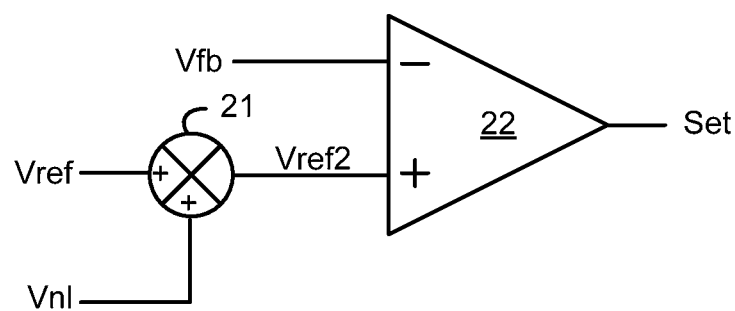
FIG. 4 schematically illustrates a comparison unit 103 according to an embodiment of the present invention.

FIG. 4 schematically illustrates general comparison unit 103 according to an embodiment of the present invention. As shown in FIG. 4, general comparison unit 103 comprises an arithmetic circuit 21 and a comparator 22. Arithmetic circuit 21 is configured to receive reference signal Vref and nonlinear control signal Vnl, and is configured to provide arithmetic signal Vref2 based on the sum of reference signal Vref and nonlinear control signal Vnl (Vref+Vnl). Comparator 22 comprises a non-inverting terminal configured to receive arithmetic signal Vref2, an inverting terminal configured to receive feedback signal Vfb, and an output terminal configured to provide set signal Set. Comparator 22 is configured to provide set signal Set via comparing feedback signal Vfb with the sum of reference signal Vref and nonlinear control signal Vnl (Vref+Vnl).

Figure 5:
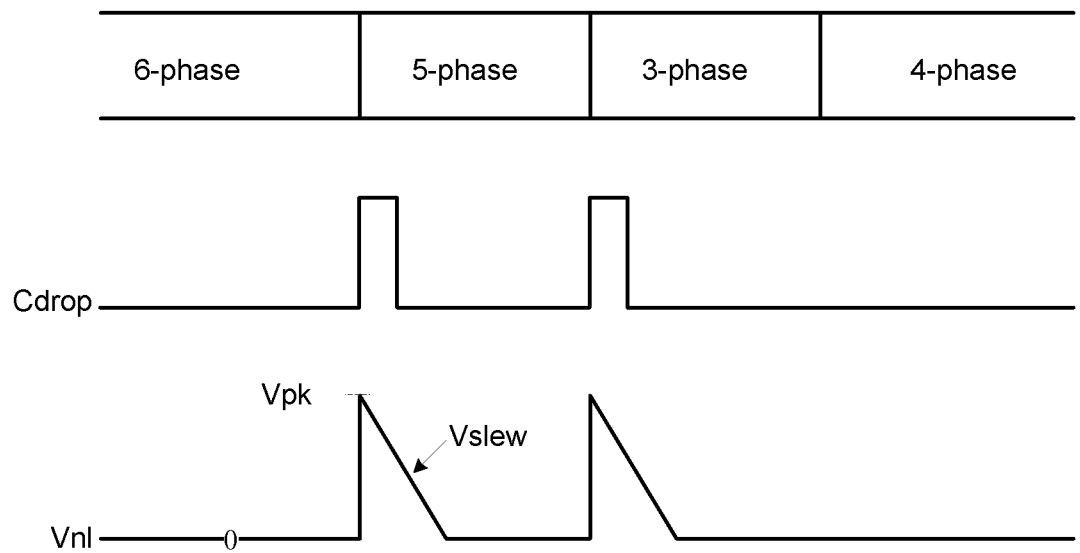
FIG. 5 diagrammatically shows generating of nonlinear control signal Vnl according to an embodiment of the present invention.

FIG. 5 diagrammatically shows generating of nonlinear control signal Vnl according to an embodiment of the present invention. As shown in FIG. 5, a positive pulse of a power indication signal Cdrop indicates that the number of switching circuits under power operation decreases, e.g., reducing from 6-phase switching circuits operation to 5-phase switching circuits operation, and reducing from 5-phase switching circuits operation to 3-phase switching circuits operation as shown in FIG. 5. In the embodiment shown in FIG. 5, the initial value of nonlinear control signal Vnl is zero. When power indication signal Cdrop indicates that the number of switching circuits under power operation decreases, nonlinear control signal Vnl increases to preset value Vpk from the initial value, and then decreases to the initial value with preset slew rate Vslew. That is once the number of switching circuits under power operation decreases, a triple wave of nonlinear control signal Vnl is added to reference signal Vref for compensation to reduce undershoot of output voltage Vo. In one embodiment, preset value Vpk and preset slew rate Vslew are adjustable and could affect undershoot performance of output voltage Vo. When the number of switching circuits under power operation increases or is unchanged, e.g., increasing from 3-phase switching circuits operation to 4-phase switching circuits operation as shown in FIG. 5, power indication signal Cdrop keeps unchanged, and nonlinear control signal Vnl is maintained at the initial value.

Figure 6:
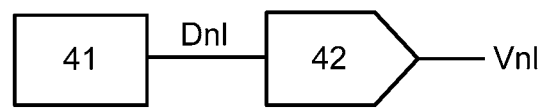
FIG. 6 schematically illustrates a nonlinear control signal generation unit 106 according to an embodiment of the present invention.

FIG. 6 schematically illustrates a nonlinear control signal generation unit 106 according to an embodiment of the present invention. In the embodiment shown in FIG. 6, nonlinear control signal generation circuit 106 comprises a digital control unit 41 and a digital-to-analog conversion unit 42. Digital control unit 41 provides a digital signal Dnl, and digital signal Dnl has a first digital value DO. When the number of switching circuits under power operation decreases, digital signal Dnl equals a second digital value Dpk, and then digital control unit 41 is configured to decrease digital signal Dnl in a plurality of steps until digital signal Dnl equals the first digital value DO. Digital-to-analog conversion unit 42 is configured to convert digital signal Dnl into nonlinear control signal Vnl via digital to analog converting.

Figure 7:
FIG. 7 diagrammatically shows generating of digital signal Dnl according to an embodiment of the present invention.
Figure 7:
Figure 7:
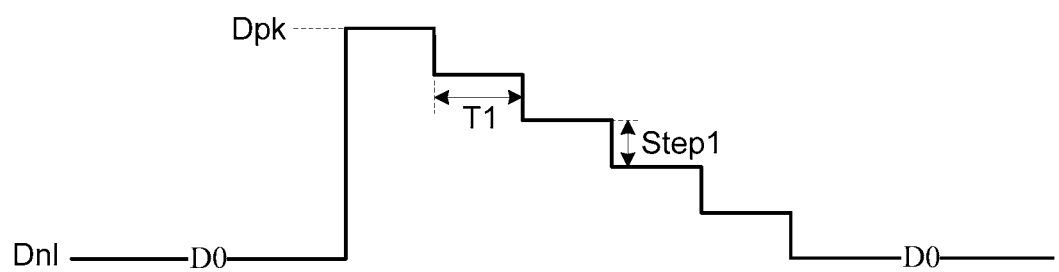

FIG. 7 diagrammatically shows generating of digital signal Dnl according to an embodiment of the present invention. As shown in FIG. 7, digital signal Dnl has first digital value DO, and when the number of switching circuits under power operation decreases, power indication signal Cdrop provides a positive pulse, digital signal Dnl equals second digital value Dpk, and then digital signal Dnl is decreased in a plurality of steps until digital signal Dnl equals first digital value DO. In one embodiment, digital control unit 41 is configured to decrease digital signal Dnl by a preset digital value Step1 during each of the plurality of steps. In one embodiment, at least one of a time period T1 of each of the plurality of steps and preset digital value Step1 is adjustable. Thus, slew rate of digital signal Dnl is determined by time period T1 of each of the plurality of steps and preset digital value Step1.

Figure 8:
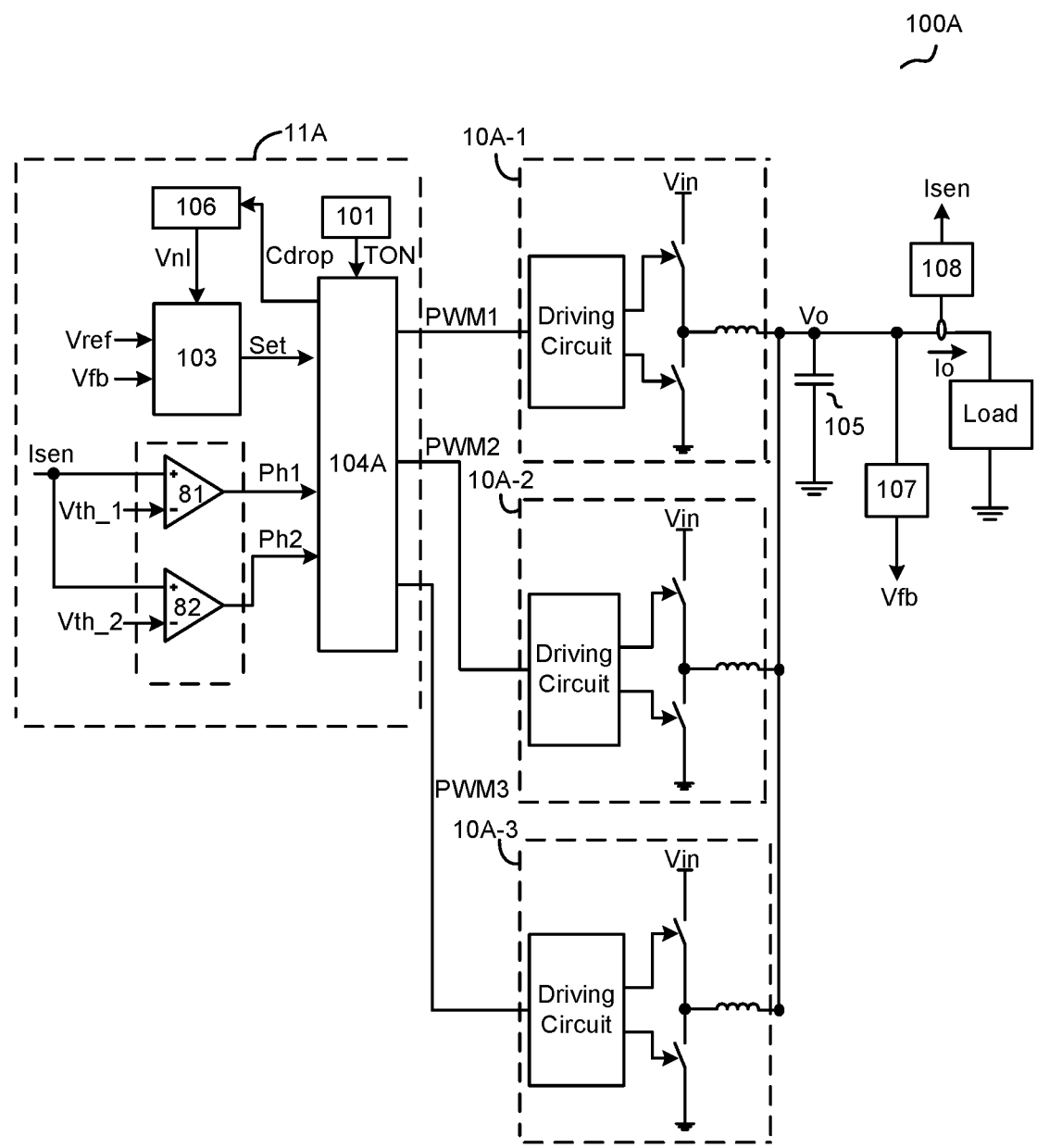
FIG. 8 schematically illustrates a three-phase converter 100A according to an embodiment of the present invention.

FIG. 8 schematically illustrates a three-phase converter 100A according to an embodiment of the present invention. In the embodiment shown in FIG. 8, switching circuits 10A-1, 10A-2, and 10A-3 employ synchronous step-down topology, however one of an ordinary skill in the art should know that other suitable topologies could also be used without detracting merits of the spirit of this invention. ON-time generation unit 101, load current comparison unit 102, general comparison unit 103, logic control unit 104A, and nonlinear control signal generation unit 106 are integrated in control circuit 11A. ON-time generation unit 101, general comparison unit 103, and nonlinear control signal generation unit 106 are the same as shown in FIG. 1.

As shown in FIG. 8, load current comparison unit 102A comprises comparators 81-83. Comparators 81-83 respectively compare current sense signal Isen with thresholds Vth_1 and Vth_2 to determine the number of switching circuits under power operation. In one embodiment, threshold Vth_1 is larger than threshold Vth_2 (Vth_1>Vth_2). When current sense signal Isen is larger than threshold Vth_1, i.e., Isen>Vth_1>Vth_2, current comparison signal Ph1=1, current comparison signal Ph2=1, all of switching circuits 10A-1, 10A-2, and 10A-3 enter power operation. When current sense signal Isen is less than threshold Vth_1, and larger than threshold Vth_2, i.e., Vth_1>Isen>Vth_2, current comparison signal Ph1=0, current comparison signal Ph2=1, two of switching circuits 10A-1, 10A-2, and 10A-3 enter power operation. i.e., switching circuits 10A-1 and 10A-2 are under power operation and switching circuit 10A-3 exits power operation, transistors in switching circuit 10A-3 are high impedance. Structure and operating principle of load current comparison unit 102 for multi-phase converter 100 is similar with load current comparison unit 102A.

Figure 9:
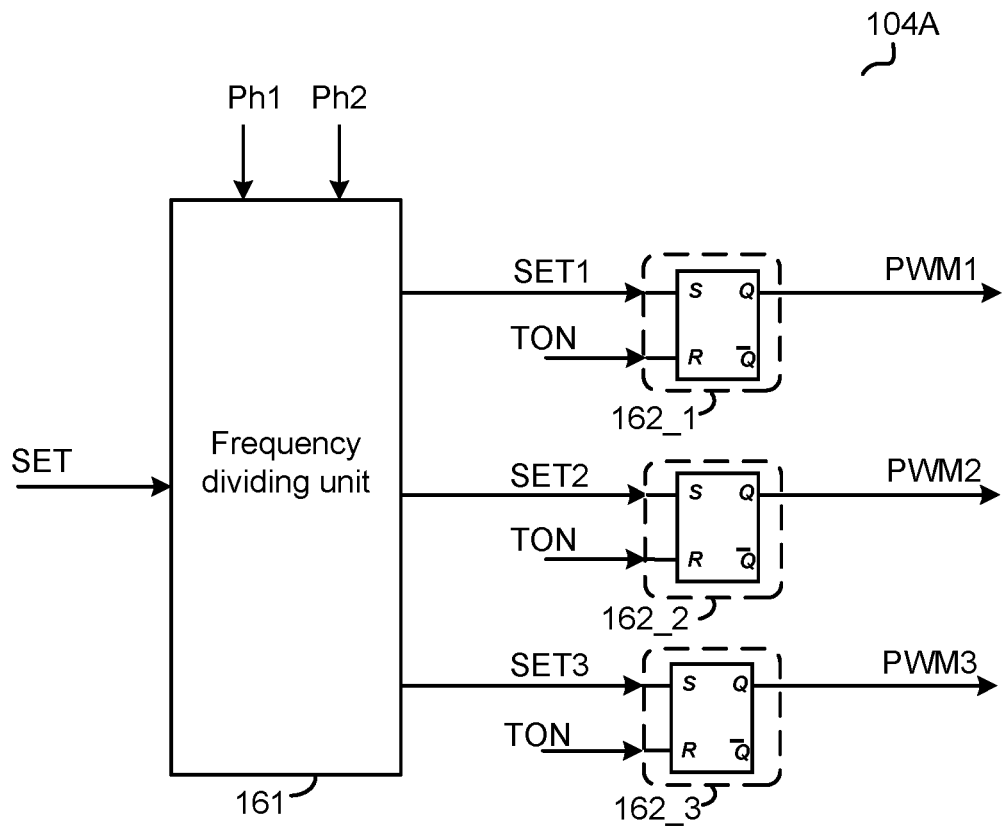
FIG. 9 schematically illustrates a logic control unit 104A as shown in FIG. 8 according to an embodiment of the present invention.
Figure 9:
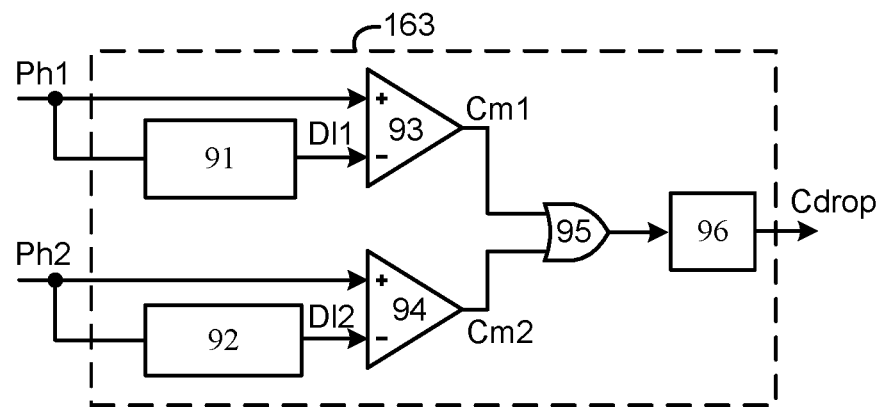

FIG. 9 schematically illustrates a logic control unit 104A as shown in FIG. 8 according to an embodiment of the present invention. Logic control unit 104 of multi-phase converter 100 is similar with logic control unit 104A. As shown in FIG. 9, logic control unit 104A comprises a frequency dividing unit 161, sub-control units 162_1, 162_2, and 162_3, and a phase dropping detection unit 163.

Frequency dividing unit 161 is configured to receive set signal Set and current comparison signals Ph1 and Ph2, and frequency dividing unit 161 is configured to distribute pulses of set signal Set to set signals SET1-SET3. In one embodiment, when current comparison signals Ph1 and Ph2 indicate that the number of switching circuits under power operation is three, pulses of set signal SET is distributed to set signals SET1-SET3 to successively turn ON switching circuits 10A-1, 10A-2, and 10A-3. When current comparison signals Ph1 and Ph2 indicate that the number of two switching circuits under power operation is two, pulses of set signal Set is distributed to two of set signals SET1-SET3 to successively turn on two of switching circuits 10A-1, 10A-2, and 10A-3. And when current comparison signals Ph1 and Ph2 indicate that the number of switching circuits under power operation is only one, pulses of set signal Set is distributed to one of set signals SET1-SET3 to turn on one of switching circuits 10A-1, 10A-2, and 10A-3, e.g., turn ON switching circuit 10A-1 based on set signal Set.

Each of sub-control units 162_1, 162_2, and 162_3 comprises a first input terminal, a second input terminal and an output terminal. The first input terminal of sub-control unit 162_1 is coupled to frequency dividing unit 161 to receive set signal SET1, the second input terminal of sub-control unit 162_1 is coupled to ON-time generation unit 101 to receive ON-time threshold TON, and the output terminal of sub-control unit 162_1 is configured to provide a control signal PWM1 to control switching circuit 10A-1. The first input terminal of sub-control unit 162_2 is coupled to frequency dividing unit 161 to receive set signal SET2, the second input terminal of sub-control unit 162_2 is coupled to ON-time generation unit 101 to receive ON-time threshold TON, and the output terminal of sub-control unit 162_2 is configured to provide a control signal PWM2 to control switching circuit 10A-2. The first input terminal of sub-control unit 162_3 is coupled to frequency dividing unit 161 to receive set signal SET3, the second input terminal of sub-control unit 162_3 is coupled to ON-time generation unit 101 to receive ON-time threshold TON, and the output terminal of sub-control unit 162_3 is configured to provide a control signal PWM3 to control switching circuit 10A-3. In one embodiment, each of sub-control units 162_1, 162_2, and 162_3 comprises a SR flip-flop. Take sub-control unit 162_1 as one example, the SR flip-flop of sub-control unit 162_1 comprises a set terminal, a reset terminal, and an output terminal, wherein the set terminal S is configured to receive set signal SET1, the reset terminal R is configured to receive ON-time threshold TON, and the output terminal Q is configured to provide control signal PWM1.

Phase dropping detection unit 163 is configured to provide power indicating signal Cdrop. For example, when current comparison signals Ph1 and Ph2 indicate that the number of switching circuits under power operation decreases, phase dropping detection unit 163 is configured to provide a pulse on power indicating signal Cdrop. In the embodiment shown in FIG. 9, phase dropping detection unit 163 comprises delay units 91 and 92, comparison units 93 and 94, and an OR gate 95. Delay unit 91 receives current comparison signal Ph1, and provides delay signal Dl1 by delaying current comparison signal Ph1 a first time period. Comparison unit 93 compares delay signal Dl1 with current comparison signal Ph1, and provides comparison signal Cm1 accordingly. Delay unit 92 receives current comparison signal Ph2, and provides delay signal Dl2 by delaying current comparison signal Ph2 a second time period. The first time period may equal the second time period. Comparison unit 94 compares delay signal Dl2 with current comparison signal Ph2, and provides comparison signal Cm2 accordingly. OR gate 95 receives comparison signals Cm1 and Cm2, and provides a signal at an output terminal of OR gate 95 via OR operating. A pulse generation circuit 96 is coupled to the output terminal of OR gate, and pulse generation circuit 96 is configured to provide power indicating signal Cdrop.

Figure 10:
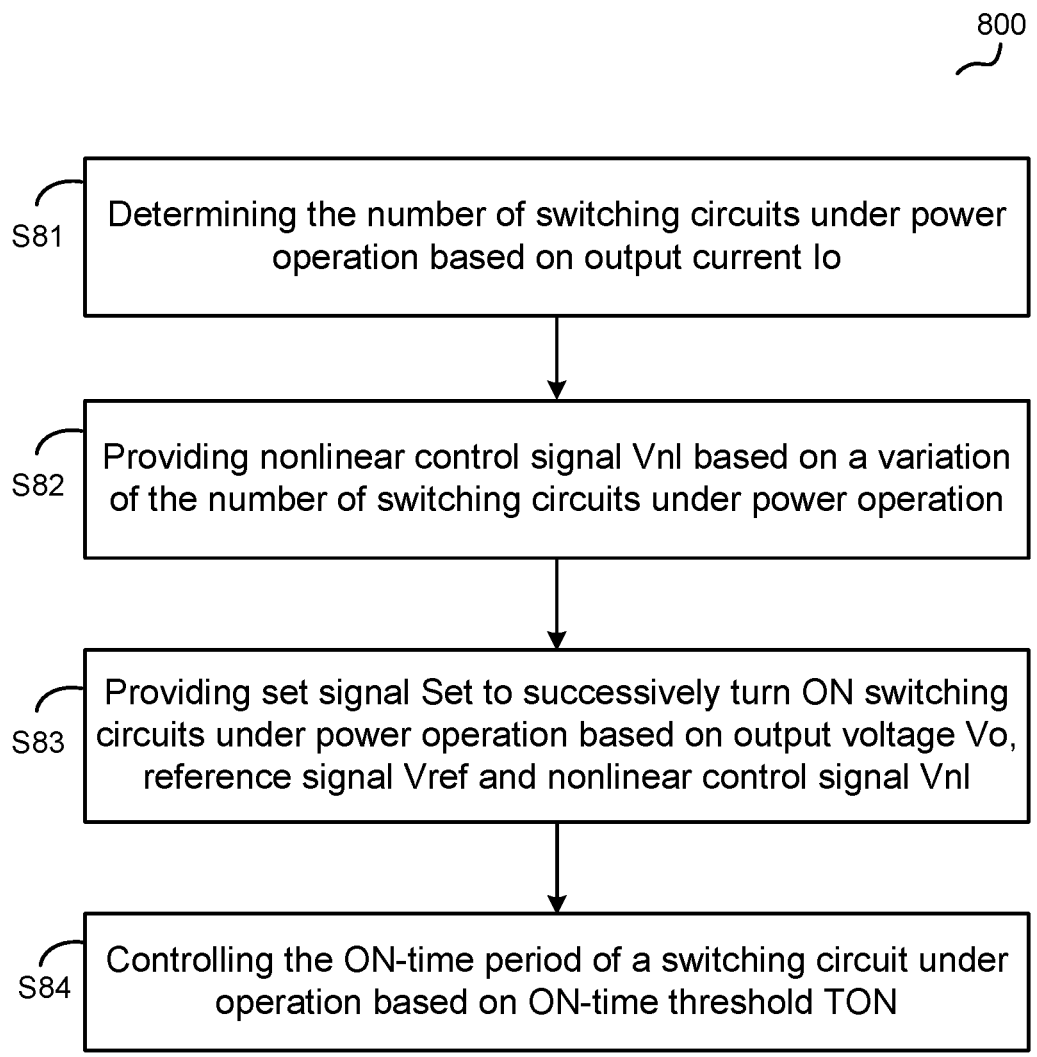
FIG. 10 shows a flow chart 800 of a control method of multi-phase converter 100 as shown in FIG. 1 according to an embodiment of the present invention.

FIG. 10 shows a flow chart 800 of a control method of multi-phase converter 100 as shown in FIG. 1 according to an embodiment of the present invention. The control method shown in FIG. 10 comprises steps S81-S84.

At step S81, determining the number of switching circuits under power operation based on load current Io of multi-phase converter 100.

At step S82, providing nonlinear control signal Vnl based on a variation of the number of switching circuits under power operation.

At step S83, providing set signal Set to successively turn ON switching circuits under power operation based on output voltage Vo, reference signal Vref and nonlinear control signal Vnl.

At step S84, controlling the ON-time period of a switching circuit under operation based on ON-time threshold TON.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A multi-phase converter, configured to receive an input voltage, and configured to provide an output voltage and a load current to a load, the multi-phase converter comprising:
   a plurality of switching circuits coupled in parallel between the input voltage and the load, wherein a number of the plurality of switching circuits under power operation is determined based on the load current; and
   a control circuit, configured to provide a set signal to successively turn ON the specific plurality of switching circuits under power operation based on the output voltage, a reference signal and a nonlinear control signal; wherein
   when the number of the plurality of switching circuits under power operation decreases, the nonlinear control signal increases to a preset value from an initial value, and then the nonlinear control signal decreases to the initial value with a preset slew rate.

2. The multi-phase converter of claim 1, wherein the control circuit further comprises:
   a digital control unit, configured to provide a digital signal, the digital signal having a first digital value, wherein when the number of the plurality of switching circuits under power operation decreases, the digital signal equals a second digital value, and then the digital control circuit is configured to decrease the digital signal in a plurality of steps until the digital signal equals the first digital value; and
   a digital-to-analog conversion unit, configured to convert the digital signal into the nonlinear control signal via digital to analog converting.

3. The multi-phase converter of claim 2, wherein the digital control unit is configured to decrease the digital signal by a preset digital value during each of the plurality of steps.

4. The multi-phase converter of claim 1, wherein the control circuit further comprises:
   a general comparison unit, configured to receive a feedback signal indicative of the output voltage, the reference signal, and the nonlinear control signal, and configured to provide the set signal via comparing the feedback signal with a sum of the reference signal and the nonlinear control signal.

5. The multi-phase converter of claim 4, wherein when the sum of the reference signal and the nonlinear control signal is larger than the feedback signal, the set signal is configured to turn ON one of the plurality of switching circuits under power operation.

6. The multi-phase converter of claim 1, wherein the initial value is zero.

7. The multi-phase converter of claim 1, wherein the preset value and the preset slew rate are adjustable.

8. The multi-phase converter of claim 1, wherein the control circuit further comprises:
a load current comparison unit, configured to receive a current sense signal indicative of the load current, and configured to control the number of the plurality of switching circuits under power operation via respectively comparing the current sense signal with a plurality of thresholds.

9. A control method for a multi-phase converter, wherein the multi-phase converter is configured to receive an input voltage, and configured to provide an output voltage and a load current to a load, and wherein the multi-phase converter comprises a plurality of switching circuits coupled in parallel between the input voltage and the load, the control method comprising:
determining what specific number of the plurality of switching circuits under power operation based on the load current;
providing a nonlinear control signal based on the number of the plurality of switching circuits under power operation, the nonlinear control signal having an initial value; and
providing a set signal to successively turn ON the plurality of switching circuits under power operation based on the output voltage, a reference signal and the nonlinear control signal; wherein
when the number of the plurality of switching circuits under power operation decreases, the nonlinear control signal equals a preset value, and then the nonlinear control signal decreases to the initial value with a preset slew rate.

10. The control method of claim 9, wherein when the number of the plurality of switching circuits under power operation increases or is unchanged, the nonlinear control signal is maintained at the initial value.

11. The control method of claim 9, wherein providing the nonlinear control signal based on the number of the plurality of switching circuits under power operation further comprises:
providing a digital signal, the digital signal having a first digital value, wherein when the number of the plurality of switching circuits under power operation decreases, the digital signal equals a second digital value, and then the digital signal is configured to decrease in a plurality of steps until the digital signal equals the first digital value; and
providing the nonlinear control signal based on the digital signal via digital to analog converting.

12. The control method of claim 11, wherein the digital signal is configured to decrease by a preset digital value during each of the plurality of steps.

13. The control method of claim 12, wherein at least one of the preset digital value and a time period of each of the plurality of steps is adjustable.

14. The control method of claim 9, wherein when a sum of the reference signal and the nonlinear control signal is larger than a feedback signal indicative of the output voltage, one of the plurality of switching circuits under power operation is turned ON by the set signal.

15. A control circuit for a multi-phase converter, wherein the multi-phase converter is configured to receive an input voltage, and configured to provide an output voltage and a load current to a load, and wherein the multi-phase converter comprises a plurality of switching circuits coupled in parallel between the input voltage and the load, the control circuit comprising:
a load current comparison unit, configured to receive a current sense signal indicative of the load current, and configured to provide a plurality of current comparison signals to control a number of the plurality of switching circuits under power operation via respectively comparing the current sense signal with a plurality of thresholds;
a nonlinear control signal generation unit, configured to provide a nonlinear control signal, wherein when the number of the plurality of switching circuits under power operation decreases, the nonlinear control signal increases to a preset value from an initial value, and then the nonlinear control signal decreases to the initial value with a preset slew rate;
a general comparison unit, configured to receive a feedback signal indicative of the output voltage, the general comparison unit is configured to provide a set signal to successively turn ON the specific plurality of switching circuits under power operation via comparing the feedback signal with a sum of a reference signal and the nonlinear control signal; and
a logic control unit, coupled to the load current comparison unit to receive the plurality of current comparison signals, and coupled to the general comparison unit to receive the set signal, the logic control unit is configured to provide multiple control signals to respectively control the plurality of switching circuits based on the plurality of current comparison signals and the set signal.

16. The control circuit of claim 15, wherein the nonlinear control signal generation unit further comprises:
a digital control unit, configured to provide a digital signal, the digital signal having a first digital value, wherein when the number of the plurality of switching circuits under power operation decreases, the digital signal equals a second digital value, and then the digital control circuit is configured to decrease the digital signal in a plurality of steps until the digital signal equals the first digital value; and
a digital-to-analog conversion unit, configured to convert the digital signal into the nonlinear control signal.

17. The control circuit of claim 16, wherein the digital control unit is configured to decrease the digital signal by a preset digital value during each of the plurality of steps.

18. The control circuit of claim 15, wherein when the number of plurality of switching circuits under power operation increases or is unchanged, the nonlinear control signal is maintained at the initial value.

19. The control circuit of claim 15, wherein when the sum of the reference signal and the nonlinear control signal is larger than the feedback signal, the set signal turns ON one of the plurality of switching circuits under power operation.

20. The control circuit of claim 15, wherein the preset value and the preset slew rate are adjustable.

* * * * *